US012768521B2

(12) United States Patent
Baker et al.

(10) Patent No.: US 12,768,521 B2
(45) Date of Patent: Oct. 20, 2026

(54) LIGHTING ELEMENT

(71) Applicant: EMERGENCY TECHNOLOGY, INC., Hudsonville, MI (US)

(72) Inventors: Douglas V. Baker, Hudsonville, MI (US); Bradley Miller, Hudsonville, MI (US); Weston Harness, Hudsonville, MI (US)

(73) Assignee: Emergency Technology, Inc., Hudsonville, MI (US)

(*) Notice: Subject to any disclaimer, the term of this patent is extended or adjusted under 35 U.S.C. 154(b) by 47 days.

(21) Appl. No.: 18/526,042

(22) Filed: Dec. 1, 2023

(65) Prior Publication Data

US 2024/0093860 A1 Mar. 21, 2024

Related U.S. Application Data

(63) Continuation of application No. PCT/US2022/031272, filed on May 27, 2022.

(60) Provisional application No. 63/196,423, filed on Jun. 3, 2021.

(51) Int. Cl.

| | |
|---|---|
| ***F21V 19/00*** | (2006.01) |
| ***F21V 15/01*** | (2006.01) |
| ***F21V 23/00*** | (2015.01) |
| *F21Y 115/10* | (2016.01) |

(52) U.S. Cl.

CPC .......... *F21V 19/0015* (2013.01); *F21V 15/01* (2013.01); *F21V 23/007* (2013.01); *F21Y 2115/10* (2016.08)

(58) Field of Classification Search

CPC .... F21V 19/0015; F21V 15/01; F21V 23/007; F21V 17/164; F21V 31/005; F21V 3/02; F21Y 2115/10; F21S 43/14; F21S 43/15; F21S 43/265; F21S 43/27; F21S 43/28135; F21S 43/31; F21S 43/37; F21S 45/50; B60Q 1/2615

See application file for complete search history.

(56) References Cited

U.S. PATENT DOCUMENTS

| | | | | |
|---|---|---|---|---|
| 7,374,322 | B2 | 5/2008 | Steen et al. | |
| 8,684,568 | B2 * | 4/2014 | Nagaoka | F21V 31/005 362/249.02 |
| 9,857,049 | B2 * | 1/2018 | Chung | F21V 3/02 |
| 10,066,808 | B2 * | 9/2018 | Fernando | F21V 17/101 |
| 10,465,899 | B2 * | 11/2019 | Goerts | F21V 17/002 |
| 2011/0280020 | A1 * | 11/2011 | Chen | F21K 9/60 362/294 |

(Continued)

FOREIGN PATENT DOCUMENTS

| | | |
|---|---|---|
| CN | 106969293 A | 7/2017 |
| CN | 108071953 A | 5/2018 |

(Continued)

OTHER PUBLICATIONS

European Patent Office, Extended European Search Report Re: Corresponding Application No. 22816675.7-1201, dated Mar. 18, 2025, 10 pages, Munich, Germany.

*Primary Examiner* — Kevin Quarterman

(74) *Attorney, Agent, or Firm* — McGarry Bair PC

(57) ABSTRACT

A lighting element assembly and method of assembling a lighting element, including an optical element having a leg extending away from the optical element, a base, and a retention element configured to retain the leg relative to the base.

14 Claims, 8 Drawing Sheets

(56) References Cited

U.S. PATENT DOCUMENTS

| | | | |
|---|---|---|---|
| 2014/0211474 A1 | 7/2014 | Juan et al. | |
| 2016/0329624 A1 | 11/2016 | Chen et al. | |
| 2018/0257542 A1 * | 9/2018 | Baker | F21S 45/49 |

FOREIGN PATENT DOCUMENTS

| | | |
|---|---|---|
| CN | 208504274 U | 2/2019 |
| CN | 211399395 U | 9/2020 |
| JP | 2004265653 A | 9/2004 |
| JP | 2008071651 A | 3/2008 |
| WO | 2017059431 A1 | 4/2017 |

* cited by examiner

LIGHTING ELEMENT

CROSS REFERENCE TO RELATED APPLICATION(S)

This application is a continuation of PCT Application No. PCT/US2022/031272, filed May 27, 2022, which claims the benefit of U.S. Provisional Patent Application No. 63/196,423, filed Jun. 3, 2021, which is incorporated herein by reference in its entirety.

BACKGROUND

This invention relates to lighting and illumination fixtures for, in one non-limiting example, a vehicle. In one of its aspects, the disclosure relates to a lighting fixture with multiple light-emitting diode (LED) light sources. In another of its aspects, the disclosure relates to a light assembly of one or more light sources and housing components.

BRIEF DESCRIPTION

In one aspect, the present disclosure relates to a lighting element assembly, including an optical element having a leg extending away from the optical element, a base defining a depression portion receiving the leg, and a retention element received by at least a portion of the depression portion and configured to retain the leg relative to the base.

In another aspect, the present disclosure relates to a method of assembling a lighting element, including receiving a leg of an optical element into a depression portion of a base, the leg defining a perimeter of the optical element, and receiving, into the depression portion, a retention element configured to retain the leg relative to the base, forming a weather-tight seal.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

DETAILED DESCRIPTION

Figure 1:
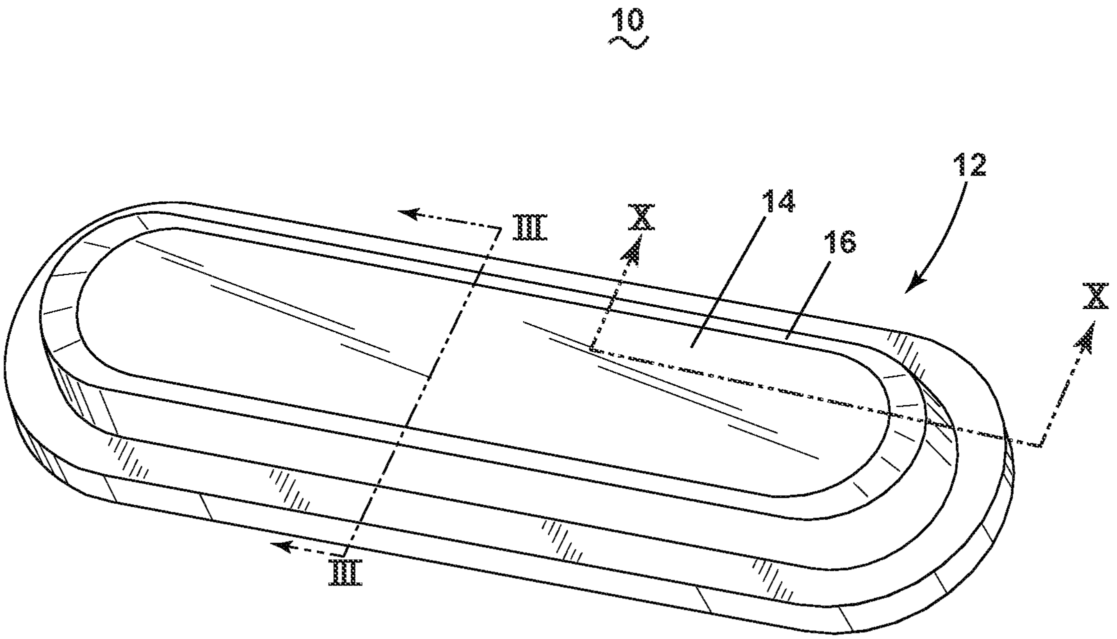
FIG. 1 illustrates a perspective view of a lighting element assembly in accordance with various aspects described herein.

Aspects of the disclosure can be implemented in any environment, apparatus, or method for illuminating or providing illumination. In one non-limiting example configuration, aspects of the disclosure can be included as lighting element or supplementary lighting element for a vehicle. For example, one non-limiting aspect of the disclosure can be utilized to provide active visual illumination, such as visual or lighting warnings, to attract the attention of motorists and pedestrians to the vehicle's presence or approach. While a "vehicle" is described, aspects of the disclosure can be applied to any vehicles, including, but not limited to, emergency vehicles (e.g. fire trucks, ambulances, law enforcement vehicles, or the like), construction vehicles (e.g. cars, trucks, construction equipment, bulldozers, cranes, or the like), land-based vehicles (pedestrian automobiles, motorbikes, all-terrain vehicles, or the like), sea-based vehicles (boats, barges, or the like), or air-based vehicles (aircraft, blimps, balloons, or the like). Non-limiting examples of vehicles can include, for instance, cars, trucks, semi-trucks, cargo carriers, boats, aircraft, and trains. Furthermore, as used herein, a vehicle does not need to include an independent propulsion system, and can include, for example, train cars, barges, trailers, or semi-trailers. In addition to vehicles, non-limiting aspects of the disclosure can also be included in stationary illumination applications, such as signage, security lighting, or the like.

While "a set of" various elements will be described, it will be understood that "a set" can include any number of the respective elements, including only one element. As used herein, the terms "axial" or "axially" refer to a dimension along a longitudinal axis described. The terms "fore" or "forward" refers to a vector in the direction of illumination of a lighting element, while the terms "aft," "backward," or "rear" used in refers to a direction opposite to the vector in the direction of illumination of the lighting element, or toward the rear lighting element.

As used herein, the terms "radial" or "radially" refer to a dimension extending between a center longitudinal axis described, an outer circumference, or a circular or annular component described.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 illustrates a lighting element assembly 10 in accordance with various aspects described herein. Non-limiting aspects of the disclosure can be included wherein the lighting element assembly 10 is a primary lighting element or a supplemental lighting element, for instance, for a vehicle or another device as described above. As used herein, a "primary" lighting element can include a primary illuminator, such as room lighting, or automobile head-lamps, while a "supplementary" lighting element can include non-primary illuminators, including, but not limited to, accessory lighting, light bars (e.g. for emergency or non-emergency vehicles), warning lighting, perimeter lighting, notification lighting, convenience lighting, special effect lighting, or the like.

The lighting element assembly 10 can include at least one optical element 12, illustrated as an optional first optical element 14 and an optional second optical element 16. While first and second optical elements 14, 16 are described, aspects of the disclosure can be included having only a single or contiguous optical element 12. Non-limiting aspects of the disclosure can be included wherein the first and second optical elements 14, 16 can be formed or molded as a single, continuous optical element 12, or can be separately formed as distinct optical elements 14, 16 and adjoined, assembled, coupled, attached, fixed, or the like. While a first optical element 14 and a second optical element 16 are described, aspects of the disclosure can be included wherein the first and second optical elements are distinguishable by way of appearance, composition, coupling or attachment, compressibility, color doping, transparency or opacity, or the like. As shown, the at least one optical element 12 can include a top portion (for example, the first optical element 14 portion) having a substantially ovate, planar surface. Aspects of the disclosure can be included wherein the top portion includes a substantially ovate cross-section (e.g. a non-planar surface), or non-ovate cross-sections, including, but not limited to, rectangular or box-like cross-sections. Also, as shown, the at least one optical element 12 can include a side portion (for example, the second optical element 16) having a peripheral wall encircling the top portion while the contours transition from the substantially planar surface of the top portion to a sidewall surface that is substantially perpendicular to the top portion or top surface. Not limiting dimensional aspects of the lighting element assembly 10 can include an assembly that is less than or equal to 10 millimeters tall (e.g. 9 millimeters, or as measured from the base of the peripheral wall to the top planar surface), between, or less than, 76.2 millimeters to 101.6 millimeters along a major body axis of the assembly 10, and less than or equal to 25.4 millimeters wide along a minor body axis of the assembly 10.

In another non-limiting aspect of the disclosure, at least one of the first or second optical elements 14, 16 can be adjoined, or the like, during the forming process. For example, the first optical element 14 can be formed, molded, manufactured, or the like, and can then be adjoined, or the like, during the forming, molding, manufacturing, or the like, of the second optical element 16. Non-limiting aspects of the disclosure can also be included wherein the compositions, colors, additives, tintings, light attenuation properties, dopings, or physical properties or characteristics can be the same or dissimilar between the first and second optical elements 14, 16. In yet another non-limiting aspect of the disclosure, at least one of the first or second optical elements 14, 16 can be formed or molded from a flexible, optical-grade silicone material or flexible optical-grade silicone material. While a flexible optical-grade silicone material is described, any silicone material can be included, including but not limited to, a silicone polymer material, or a non-rigid polymer material.

Figure 2:
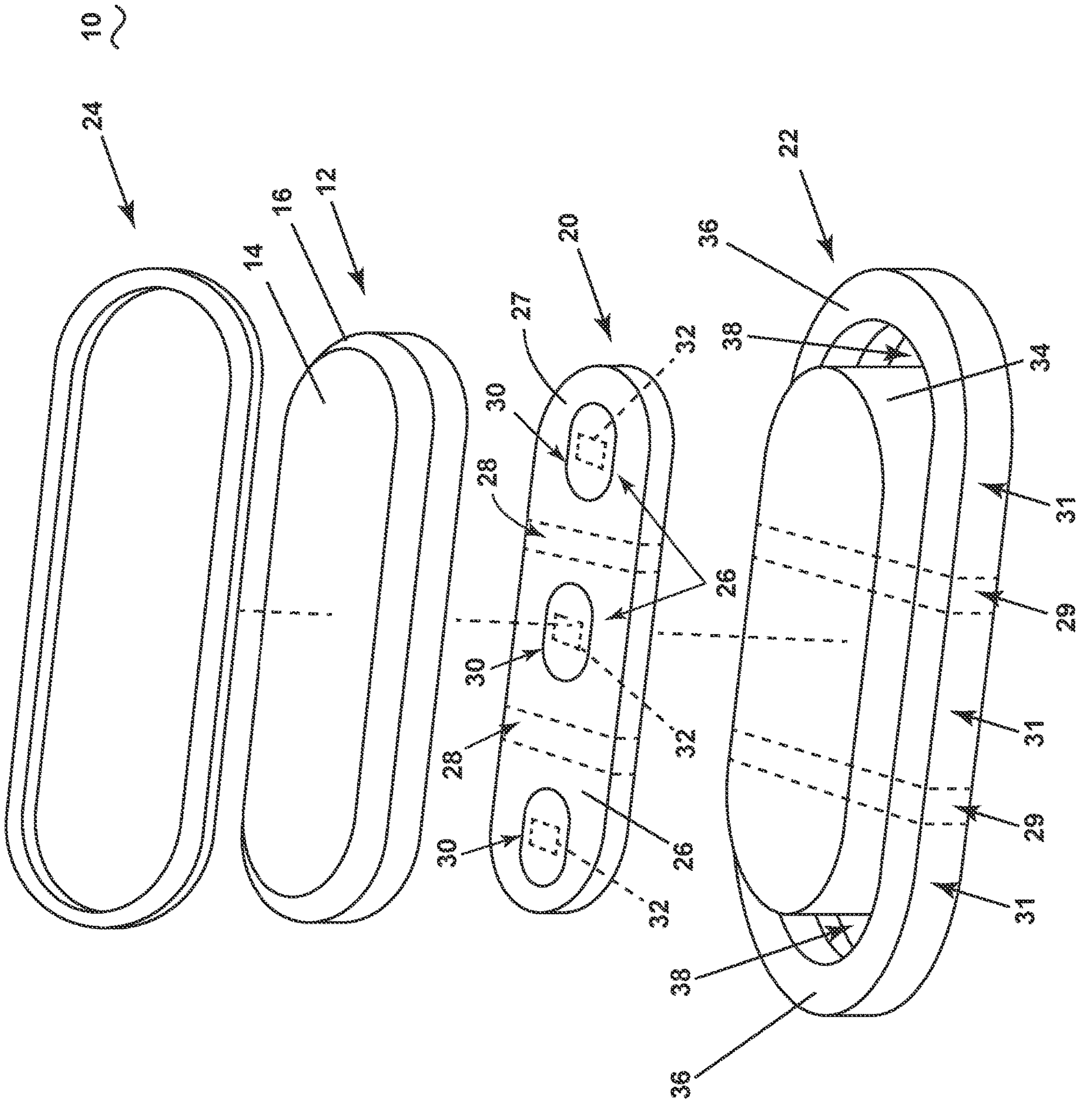
FIG. 2 illustrates an exploded perspective view of the lighting element assembly of FIG. 1, in accordance with various aspects described herein.

FIG. 2 illustrates an exploded view of the lighting element assembly 10. As shown, the lighting element assembly can further include the optical element 12, an electronics board portion 20, a lighting element base 22, and a retention element, retaining element, or the like. One non-limiting example of a retention element adapted or configured to retain the optical element 12 relative to the lighting element base 22 can include a bezel 24, as illustrated. The electronics board portion 20 can further include segments 26, individual portions, or subportions laterally arranged about the major body axis of the electronics board portion 20, and adjacently spaced from each other by alternating dividing portions 28. In one non-limiting example of the disclosure, the dividing portions 28 between the segments 26 can be bendable, flexible, adjustable, or the like, relative to the substantially planar electronics board portion 20. In another non-limiting example of the disclosure, the dividing portions 28 between the segments 26 can contact the lighting element base 22 in planar or non-planar corresponding regions for each respective segment 26.

The electronics board portion 20 can further include, but is not limited to a circuit board 27, such as a printed circuit board (PCB), supporting at least one illuminator and supporting circuitry. In the non-limiting illustrated example, the at least one illuminator can include a set of light-emitting diodes (LEDs), and the supporting circuitry can include controller modules configured to operate the set of LEDs, power electronics for converting, regulating, or supplying appropriate power levels to the LEDs, and the like. As shown, each segment 26 can further include one or more light module groups 30 is shown in dotted outline, wherein each group can include the at least one illuminator, the supporting circuitry, or a combination thereof, and schematically shown as box 32. Non-limiting aspects of the disclosure can be included wherein the entire set of the LEDs, or a subset thereof, are positioned or located along a common axis, a common plane, or a common two-dimensional array of an individual segment 26, an individual light module group 30. In another non-limiting example, a set or subset of the LEDs can be positioned or located along a common axis, a common plane, or a common two-dimensional array of the electronic board portion 20. Further non-limiting aspects of the electronics board portion 20 or the circuit board 27 can be included wherein any portion or subportion the electronics board portion 20, the circuit board 27, or a substrate thereof can be rigid or flexible.

Non-limiting aspects of the circuit board 27 can also include a set of mountings (not shown) configured to receive a corresponding or matching set of fasteners. Non-limiting examples of fasteners can include adhesives, mechanical fasteners, screws, nails, rivets, or the like, to enable or provide for physical attachment or coupling of the electronics board portion 20 or the lighting element assembly 10 to a mounting surface, such as the surface of a vehicle (not shown). In another non-limiting example, the fasteners can enable or provide for physical attachment or coupling of the electronics board portion 20 to one or more of the other assembly 10 components. Additionally, or alternatively, non-limiting aspects of the disclosure can be included wherein the lighting element base 22 can include attachment features, including threaded, splined, adhesive, snap-on, or the like, to connect or couple with additional lighting element assemblies 10, or an additional structure, such as a vehicle or object. In yet another additional or alternative example, non-limiting aspects of the disclosure can include assembly features enabling or allowing for registration or alignment of the lighting element assembly 10 components to ease in manufacture or combination of the assembly 10 components.

The base 22 can include a generally ovate shape and define a central platform 34 or stand rising away from the base 22 in a generally perpendicular direction. In one non-limiting example, the platform 34 can generally match the shape of the electronics board portion 20, and can receive the electronics board portion 20. In another example, the base 22, the platform 34, or any sub combination of corresponding features can be arranged in a non-perpendicular configuration, relative to the base 22 (e.g. extending perpendicular away from the base 22, or a surface assembling relative to the base 22). In non-limiting examples, features can extend away from the base 22 of a surface the base assembles relative to, at offset angles ranging from 0 to 90 degrees. The base can further include an outer ring 36 in a generally ovate shape extending along the perimeter of the base 22 and also at least partially rising away from the base 22 in a generally perpendicular direction. Non-limiting examples of the outer ring 36 and the platform 34 can rise away from the base 22 in a common direction. The base 22 can further include a depression portion 38 extending between the platform 34 and the outer ring 36, wherein the depression portion 38 defines a height less than the extension of the platform 34 or defines a height less than the extension of the outer ring 36. In yet another non-limiting aspect of the disclosure, the depression portion 38 can include formation by way of planar or non-planar arrangement relative to other aspects of the base 22, including but not limited to a three-dimensional spline attachment feature, or other attachment features described herein.

Non-limiting aspects of the base 22 can include or incorporate heat sink capabilities, including but not limited to, comprising a thermally conductive material, such as a metal, metal alloy, or the like, or a composition selected for thermally conductive properties. In another non-limiting aspect, the base 22 can include a thermal transfer layer, such as a thermally conductive pad or compound (not shown), to facilitate or enable thermal conductivity, for example, from the electronics board portion 20 to the base 22. Furthermore, non-limiting aspects of the base 22 can further include segments 31 and dividing portions 29, similar to those described with respect to the electronic board portion 20. Aspects of the base 22 can further be included wherein the segments 31 of the base align with the assembled segments 26 of the electronic board portion 20, and wherein the dividing portions 29 of the base 22 align with the assembled dividing portions 28 of the electronic board portion 20.

The bezel 24 can define a generally ovate shape, and include a ring having a central opening. Non-limiting examples of the bezel 24 can be sized or shaped such that the ring having the central opening can be configured to be received around an outer perimeter of the optical element 12. Stated another way, the optical element 12 can be received at least partially through the opening of the bezel 24. In another non-limiting example, the bezel 24 can be sized or shaped such that the bezel can be received by the depression 38 of the base 22, that is, the bezel 24 can be received at least partially between the outer ring 36 and the platform 34 of the base 22. Furthermore, portions or subportions of the bezel 24 can be flexibly defined, such as portions aligned with the dividing portions 28, 29 of the respective electronic board portion 20 or base 22, when assembled. Non-limiting aspects of the retaining element or bezel 24 can include a preformed composition, a formed-in-place composition, a prefabricated composition, an injection molded composition, a dispensed fabrication, an applied fabrication, a flexible or compressive composition, a rigid composition, a semi-rigid composition, an overmolding fabrication, or the like.

Non-limiting aspects of FIG. 2 can be included, but are not illustrated, for brevity. For example, non-limiting aspects of the base 22 can include apertures or pass-throughs for electrical connections for the electronic board portion 20, mounting components, thermal management components, or the like.

Figure 3:
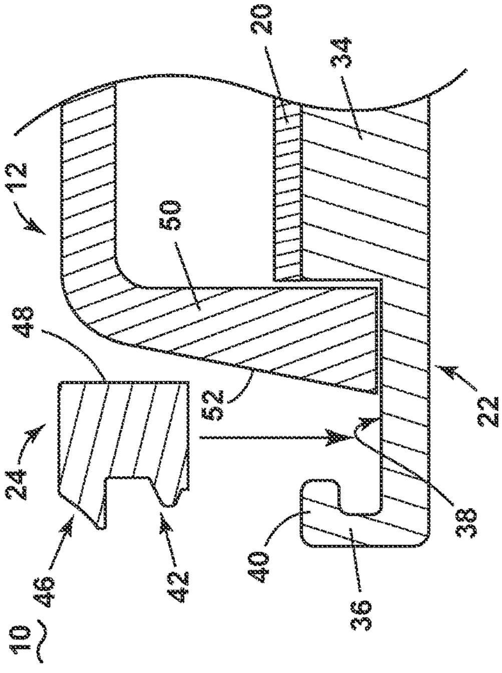
FIG. 3 illustrates a cross-sectional view of the lighting element assembly, taken along line III-III of FIG. 1, in accordance with various aspects described herein.

FIG. 3 illustrates a partial cross-sectional view of non-limiting aspects of the lighting element assembly 10, taken in the view of line III-III of FIG. 1. As shown, the outer ring 36 of the base 22 can include a lateral edge or lip 40 extending radially inward toward the platform 34. In this sense, the lip 40 can overhang at least a portion of the base 22 or the depression 38. In non-limiting examples, the lip 40 can extend along the entire outer ring 36 of the base 22. In another non-limiting example, the lip 40 only extend during one or more partial portions of the outer ring 36 of the base 22.

The bezel 24 can include a first protrusion 42 extending from the bezel 24 and positioned proximate to a portion of the bezel 24 received by the depression 38 of the base 22. As shown, non-limiting aspects of the first protrusion 42 can include one or more angled surfaces sloping toward the protrusion 42. The bezel 24 can also define a depression 44 edge from which the first protrusion 42 extends from, the depression 44 edge defined by a circumferentially outer-facing wall of the bezel 24. In yet another non-limiting example of the bezel 24, the bezel 24 can include a second protrusion 46 positioned away from the first protrusion 42, such as spaced from the first protrusion 42 by the depression 44 edge. Stated another way, the second protrusion 46 can be positioned away from a portion of the bezel 24 received by the depression of the base 22. In yet another non-limiting example of the bezel 24, the first and second protrusions 42, 46 can extend away from a core of the bezel 24, or away from the depression 44 edge of the bezel 24 in a common direction. The common direction of extension of the first and second protrusions 42, 46 can be parallel to each other, or can extend in a circumferentially outer-facing direction of the bezel 24. In yet another non-limiting example of the disclosure, the bezel 24 can define a rear wall 48 extending circumferentially along the bezel 24 and facing in a radially inward direction.

Non-limiting aspects of the disclosure can be included wherein the lighting element assembly 10 can be assembled wherein the base 22 can receive the electronics board portion 20 at or on the platform 34. The optical element 12 can then be positioned about the base 22 such that a leg 50 of the optical element 12 (e.g. a downward-extending leg 50 extending along the entire perimeter of the optical element 12) can be received at or by the depression 38 of the base 22, encircling or encompassing the platform 34 of the base 22 or the electronics board portion 20.

Further during assembly of the lighting element assembly 10, the bezel 24 can be received toward the depression 38 of the base 22. For example, the bezel 24 can be received in a downward motion (schematically shown by arrow). In yet another non-limiting example, the bezel 24 can be received between the outer ring 36 and the platform 34 or between the outer ring 36 and the leg 50 of the optical element 12.

The downward motion of the bezel 24 relative to the base 22 can cause interaction between the bezel 24 and the base 22. In one example, the interaction can include interaction between the bezel 24 and the lip 40 of the outer ring 36, such as between the first protrusion 42 and the lip 40. The downward motion can, for example, cause the abutment of the bezel 24, the first protrusion 42, or the like, to contact, compress, partially flex, or otherwise cause a temporary deformation of the lip 40, the outer ring 36, or the like, such that the first protrusion is ultimate received below or beneath the lip 40 (e.g. proximate to the depression 38 of the base 22). During this downward motion, the rear wall 48 of the bezel 24 can further abut or contact a circumferential outer wall 52 of the leg 50 of the optical element 12. In this sense, the downward motion of the bezel 24 relative to the base 22 can bend, flex, compress, or partially deform at least one of the lip 40, the outer ring 36, the bezel 24, the first protrusion 42, the leg 50, or the optical element 12, until the bezel 24 is received at the base 22, such as when the first protrusion 42 is below or beneath the lip 40, or the bezel 24 is received by the depression 38 of the base 22. As described herein, the bending, flexing, compressing, or partially deformations can be temporary. In non-limiting examples, the angled surfaces of the first protrusion 42 can aid, guide, or assist in the downward motion of assembling the bezel 24 relative to the base 22.

Figure 4:
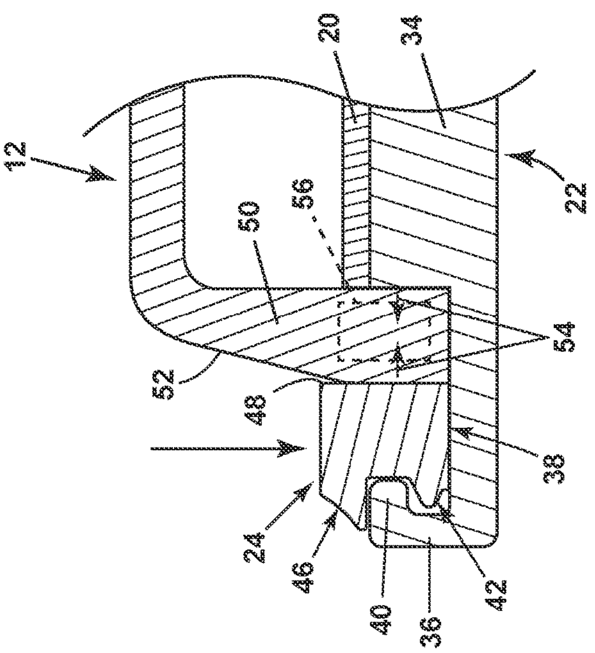
FIG. 4 illustrates a cross-sectional view of the lighting element assembly, in accordance with various aspects described herein.

FIG. 4 illustrates an assembled cross-sectional view of the lighting element assembly of FIG. 3, when the bezel 24 is received at the base 22. As shown, the depression 44 edge of the bezel 24 can be sized or shaped to receive the lip 40 when assembled. In this sense, when assembled, the bezel is 24 is retained by the lip 40 in position, as illustrated. Additionally, the rear wall 48 of the bezel 24, when moved downwardly during assembly, can abut and contact the outer wall 52 of the leg 50 of the optical element 12. In one non-limiting example, the bezel 24 can in turn compress the leg 50 inward, as shown by arrows 54, such that a portion of the leg 50 becomes under compression or compressive stress (the compression portion schematically illustrated as dotted box 56). In another example, at least a portion of the compression or compressive stress can occur because of the leg 50 pressing or contacting the platform 34.

When assembled, the movement of the bezel 24 relative to the optical element 12, the base 22, subcomponents thereof, or a combination thereof, forms a reliable and tight lighting element assembly 10 about the electronics board portion 20. In this sense, the electronics board portion 20 is sealed and protected from the external environment by way of the assembling. This protection can include weather protection, water-tight protection, or the like. In one non-limiting example, the assembly of the bezel 24 relative to the base 22 can include a snap assembly. In another non-limiting example, the assembly of the bezel 24 relative to the base 22 can further include additional steps or components, or intervening steps or components. For example, non-limiting aspects of the disclosure can further include a potting material or composition to fill in spaces to ensure protective enclosures between respective components. In another non-limiting example, respective components can be assembled or affixed relative to each other by way of ultrasonic welding or the like. In yet another non-limiting example, an additional step of intentional deformation can occur, such as a crimping or the like, to ensure protective enclosing. Non-limiting crimping examples can include a circumferential arrangement if impingement, or an axial direction of compression crimping action (at least partially parallel with the optical output axis). In another non-limiting example, the affixing of the bezel 24 relative to the base 22 can be removable for disassembly. In yet another example, at least one of the bezel 24 or base 22 (or subcomponents of either) can include retention features to ensure proper affixing relative to teach other during assembly, or in response to compressive or compressible interaction. Example retention features can include, but are not limited to, micro-retention features, barbs, deformation areas, grips, weather-resistive elements, heat activated retention features, water-activated retention features, smoothing or texturing of interfacing surfaces (e.g. rear wall 48 or outer wall 52), or the like.

While only a partial cross-sectional view is shown, non-limiting aspects of the disclosure can be included wherein the entire perimeter of the lighting element assembly 10 includes the affixing of the bezel 24 relative to the base 22, as described herein. In another non-limiting example of the lighting element assembly 10, only a portion or only a subset of portions of the perimeter of the lighting element assembly 10 includes the affixing of the bezel 24 relative to the base 22, as described herein.

Figure 5:
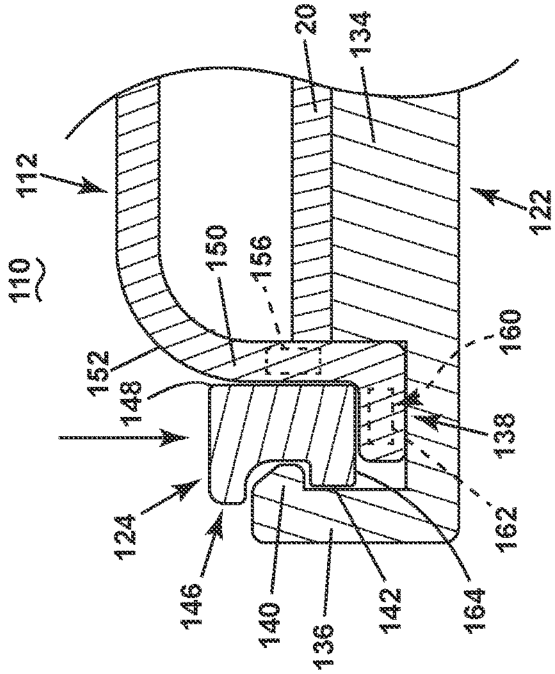
FIG. 5 illustrates additional aspects of a lighting element assembly, in accordance with various aspects described herein.

FIG. 5 illustrates another lighting element assembly 110 according to another aspect of the present disclosure. The lighting element assembly 110 is similar to the lighting element assembly 10; therefore, like parts will be identified with like numerals increased by 100, with it being understood that the description of the like parts of the lighting element assembly 10 applies to the lighting element assembly 110, unless otherwise noted. One difference is leg 150 of the optical element 112 further includes a foot 160 extending radially away from leg 150 at the base of the leg 150 perimeter. In this sense, the foot 160 is an outwardly extending portion of the optical element 112 leg 150.

During assembly, the bezel is 124 is retained by the lip 140 in position, as illustrated. Additionally, the rear wall 148 of the bezel 124, when moved downwardly during assembly, can abut and contact the outer wall 152 of the leg 150 of the optical element 112. In one non-limiting example, the bezel 124 can in turn compress the leg 150 inward such that a first portion of the leg 150 becomes under compression or compressive stress (the compression portion schematically illustrated as dotted box 156). In addition to the compressed first portion 156, at least a second portion of the compression or compressive stress can occur at the foot 160 in response to a lower surface 164 of the bezel 124 compressing the foot 160 in response to the downward motion of the assembling. In this example, the second portion of compression is schematically illustrated by dotted box 162, and occurs when the bezel 124 presses the foot 160 toward the depression portion 138 of the base 122.

Non-limiting aspects of the disclosure can be included wherein the second portion 162 further enables the sealing or environmental protection features described herein.

Figure 6:
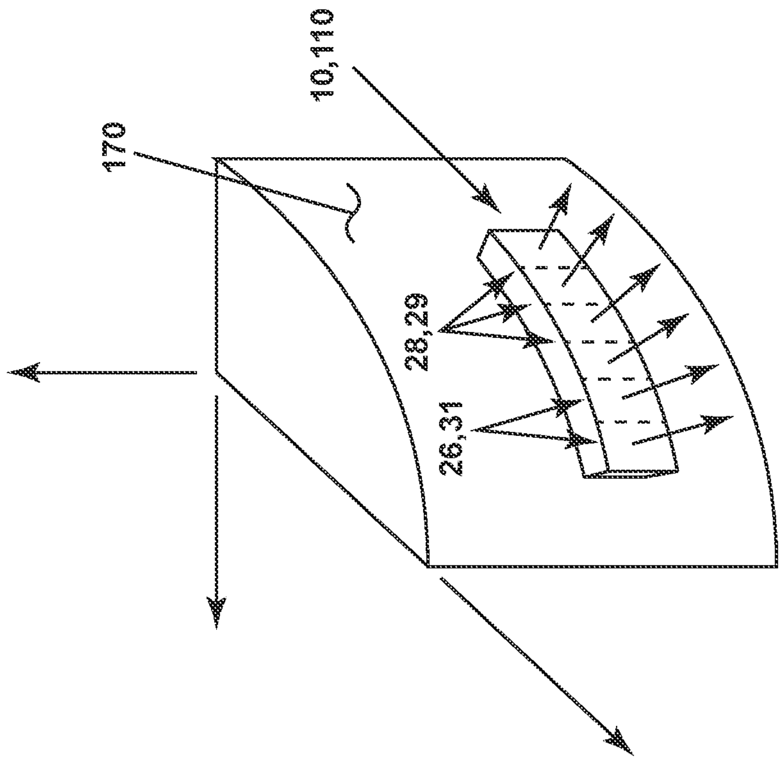
FIG. 6 illustrates aspects of the lighting element assembly positioned on a non-planar surface, in accordance with various aspects described herein.

FIG. 6 illustrates a perspective view of a non-limiting example of the lighting element assembly 10, 110 attached to or coupled with a curved surface 170 or curved body. Non-limiting examples of curved surfaces 170 can include a convex surface, a concave surface, a partially convex surface, a partially concave surface, a generally or partially non-planar surface, or a combination thereof. Another non-limiting example of a curved surface 170 can include contoured surfaces, such as those on a vehicle. In yet another non-limiting example, a curved surface 170 can be defined by a radius, a spline, a compound spline (e.g. existing a three-dimensional space), or a combination thereof. In yet another non-limiting aspect of the disclosure, the design can include a tensioned arrangement for convex curvatures (e.g. where individual lighting element assemblies 10, 110 mechanically interface), or a compressive arrangement for concave curvatures. In this example tensioned arrangement, the outer most lighting element assemblies 10, 110 of an assembled group of assemblies 10, 110 will perform the majority of the fastening and attachment a mounting surface (majority being by number of fastenings, by fastening strength, fastening effectiveness, or the like), and holding individual assemblies 10, 110 in between end assemblies 10, 110, in tension or compression, respectively.

As shown, non-limiting aspects of the lighting element assembly 10, 110 can be adapted to a curved surface 170 by way of limited bending, flexibility, or angling, for example, as enabled by flexible dividing portions 28 of the electronics board portion 20 and the flexible dividing portions 29 of the base 22. In this sense, the flexible dividing portions 28, 29 can enable the lighting element assembly 10 to be contoured relative to a curved surface 170 with shaping, flexing, or curving tolerances, for example, defined by the dividing portions 28, 29. In this example, the shaping, flexing, or curving tolerances defined by the dividing portions 28, 29 can further be limited to define maximum or minimum flexing such that the lighting element assembly 10, 110 can be reliably certified for particular operational uses, including, but not limited to, curved operational uses certified for SAE J845, SAE J595, ECE R65, related predefined standards for light emission patterns (including, but not limited, to those at a curved surface), or the like.

Even when assembled on a curved surface 170, each segment 26, 31 of the respective electronics board portion 20 or base 22 can define a generally planar surface, or multiple generally planar surfaces, from which the light module groups 30 can illuminate or project light from (as shown schematically by arrows), wherein each segment 26, 31 planar surface can be angled relative to another segment 26, 31 planar surfaces, or subset thereof. Enabling the attachment or contouring of the lighting element assembly 10, 110 allows for programmatic illumination, including, but not limited to, sweeping illumination patterns which can appear “rotational” to a viewer spaced from the lighting element assembly 10, 110. As used herein, a “rotational” sweeping illumination pattern can include a programmatic patterning of illumination that appears as if the stationary lighting modules are a continuously illuminated, single illumination source that is rotating in one or more directions about the curved surface 170.

Figure 7:
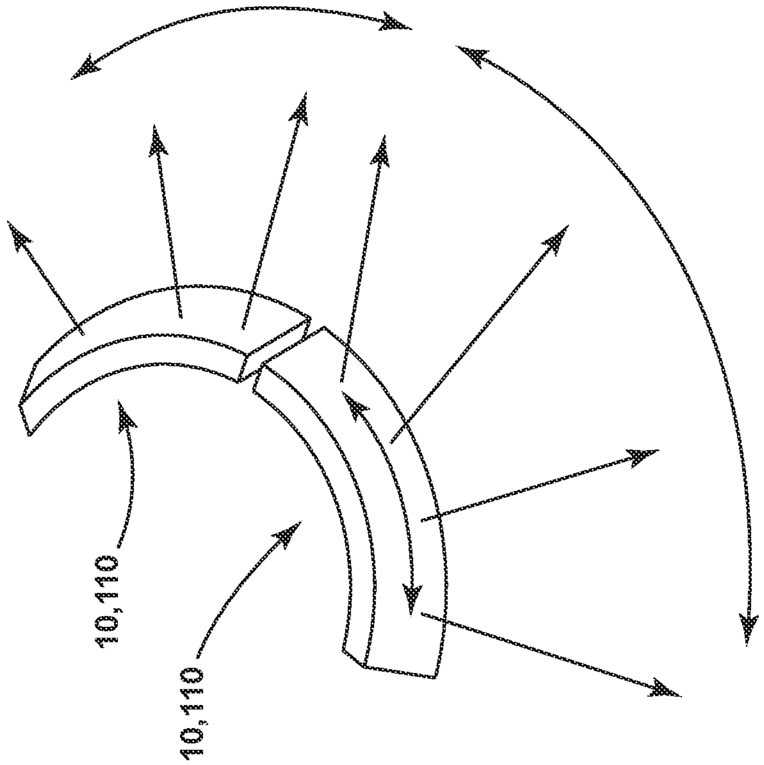
FIG. 7 illustrates aspects of multiple lighting element assemblies positioned on a non-planar surface, in accordance with various aspects described herein.

FIG. 7 illustrates another perspective view of multiple lighting element assemblies 10, 110 attached with or contoured with a different curved surface (not shown), enabling laterally adjacent assembly of the lighting element assemblies 10, 110. In this sense, the patterning can extend beyond a single lighting element assembly 10, 110, and, for example, can include a “rotational” sweeping illumination pattern that is programmatically continued on adjacent lighting element assemblies 10, 110.

Figure 8:
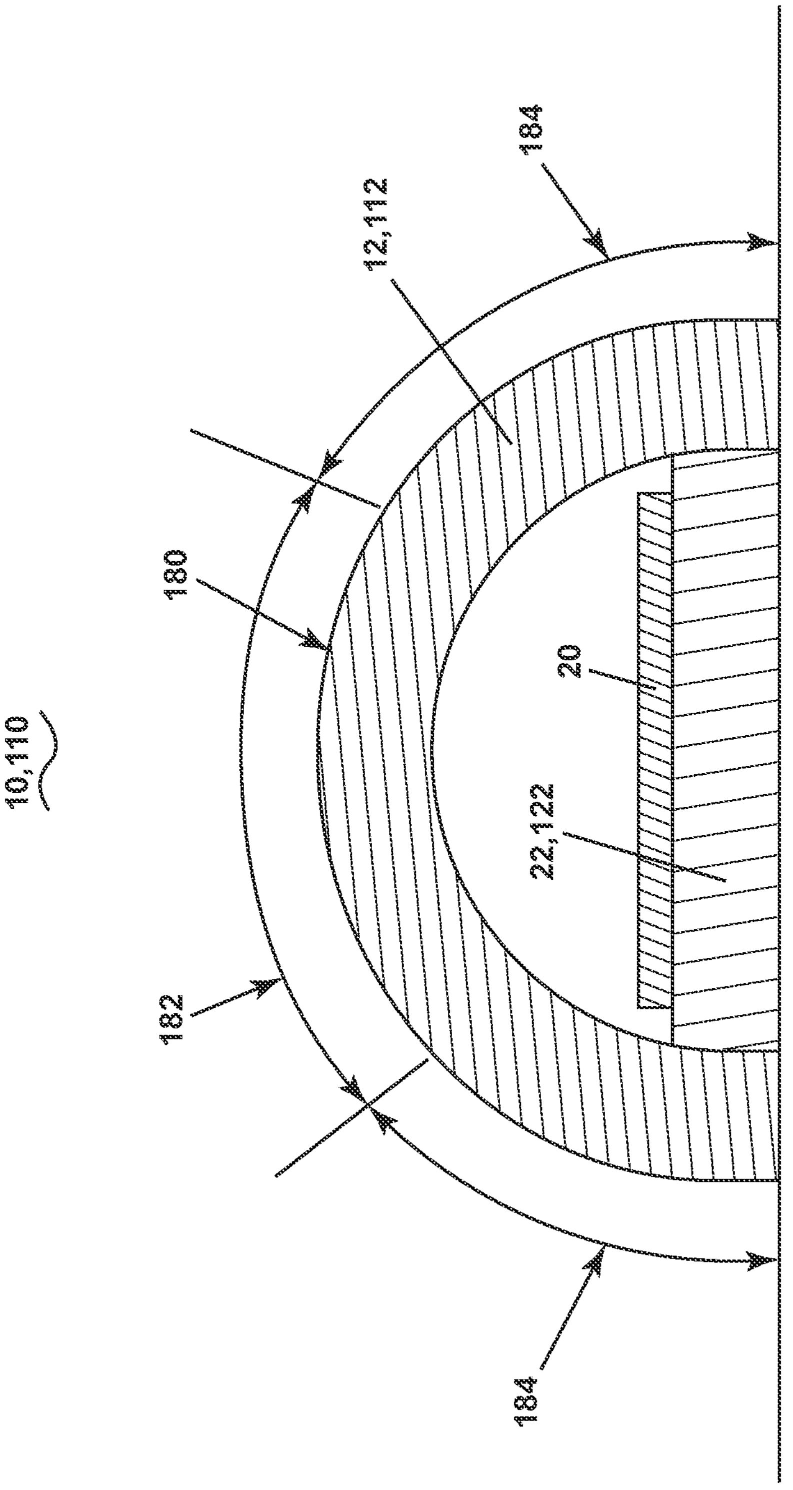
FIG. 8 illustrates a schematic cross-sectional view of the lighting element assembly, in accordance with various aspects described herein.

FIG. 8 illustrates a cross sectional view of a schematic representation of the lighting element assembly 10, 110, where some features of the lighting element assembly 10, 110 are not detailed, for ease of understanding and brevity. An outer surface 180 of the optical element 12, 112 can include additional materials or compositions to enable further features, in accordance with aspects described herein. For example, a first top radial portion 182 of the optical element 12, 112 defined by a planned, designed, or projected path of illumination from the light source(s) can include a coating to promote, preserve, improve, or otherwise include properties relating to transparency, opacity, environmental protection, chemical resistance, abrasion or abrasion resistance, dust adhesion or dust resistance, or a combination thereof. Similarly, adjacent lateral second side radial portions 184 of the optical element 12, 112 can include a coating to promote, preserve, improve, or otherwise include properties relating to transparency, opacity, environmental protection, chemical resistance, abrasion or abrasion resistance, dust adhesion or dust resistance, or a combination thereof. In non-limiting examples, the coating of the first top radial portion 182 can be different from the coating of the second side radial portions 184 of the optical element 12, 112. While a generally planar electronics board portion 20 is illustrated, non-limiting aspects of the disclosure can be included wherein the electronics board portion 20 is non-planar.

Non-limiting examples of one or more of the coatings can include application by way of spray-coating, molded coating, bonding, printing, co-molding, mechanical coupling, or the like.

Figure 9:
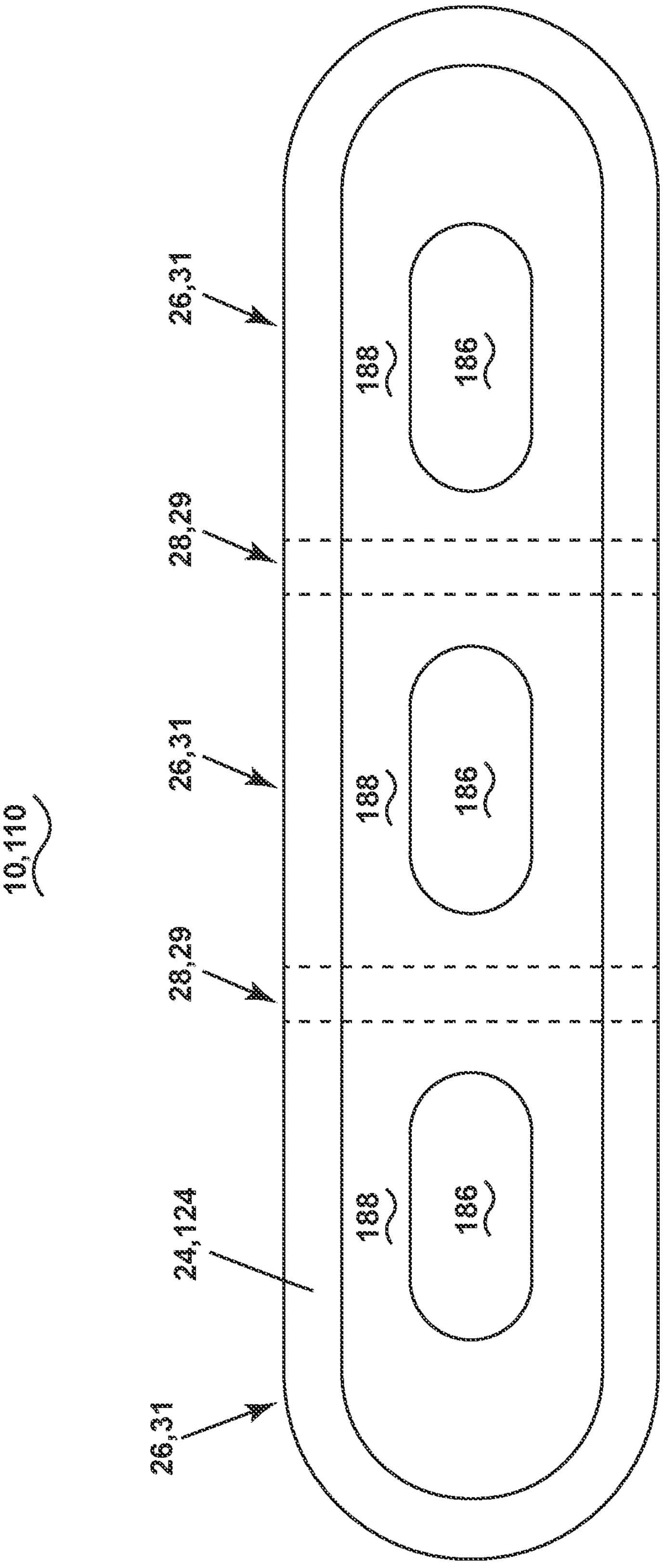
FIG. 9 illustrates a top-down view of aspects of the lighting element assembly, in accordance with various aspects described herein.

FIG. 9 illustrates a non-limiting top-down view of the lighting element assembly 10, 110 described herein. Additional or alternative aspects of the disclosure can be included wherein, for example, optical attenuation properties can be varied at different portions of the lighting element assembly 10, 110. For instance, optical attenuation properties can include different optical density attenuation properties, transparency properties, opacity properties, colorizing properties (e.g. portions having a more color of different color relative to a different portion), the like, or a combination thereof. For instance, a first portion 186, such as a portion positioned relative to the light module groups 30, and can include optical attenuation properties to ensure transparency to allow maximum light transmission. In another instance, a second portion 188 can include different optical attenuation properties, such as opacity to conceal the lighting element assembly 10, 110 relative to a mounting surface (e.g. color matching, opacity, etc.). In additional or alternative aspects of the disclosure, selective optical attenuation properties can be enabled, designed, or configured in a one or more portions 186, 188, such as transitioning effects between portions 186, 188, or transition within a single portion. In yet another example, selective optical attenuation properties can be enabled, designed, or configured in a one or more portions 186, 188 to enable or allow for illuminated identification of an overall lighted pattern for one or more lighting element assemblies 10, 110. For instance, dotting, micro-elements, or patterning of optical attenuation properties on one or more lighting element assemblies 10, 110 can enable or allow for signage, logos, advertising, wording, accentuation of a topic or image, or other viewer-identification abilities or properties.

Figure 10:
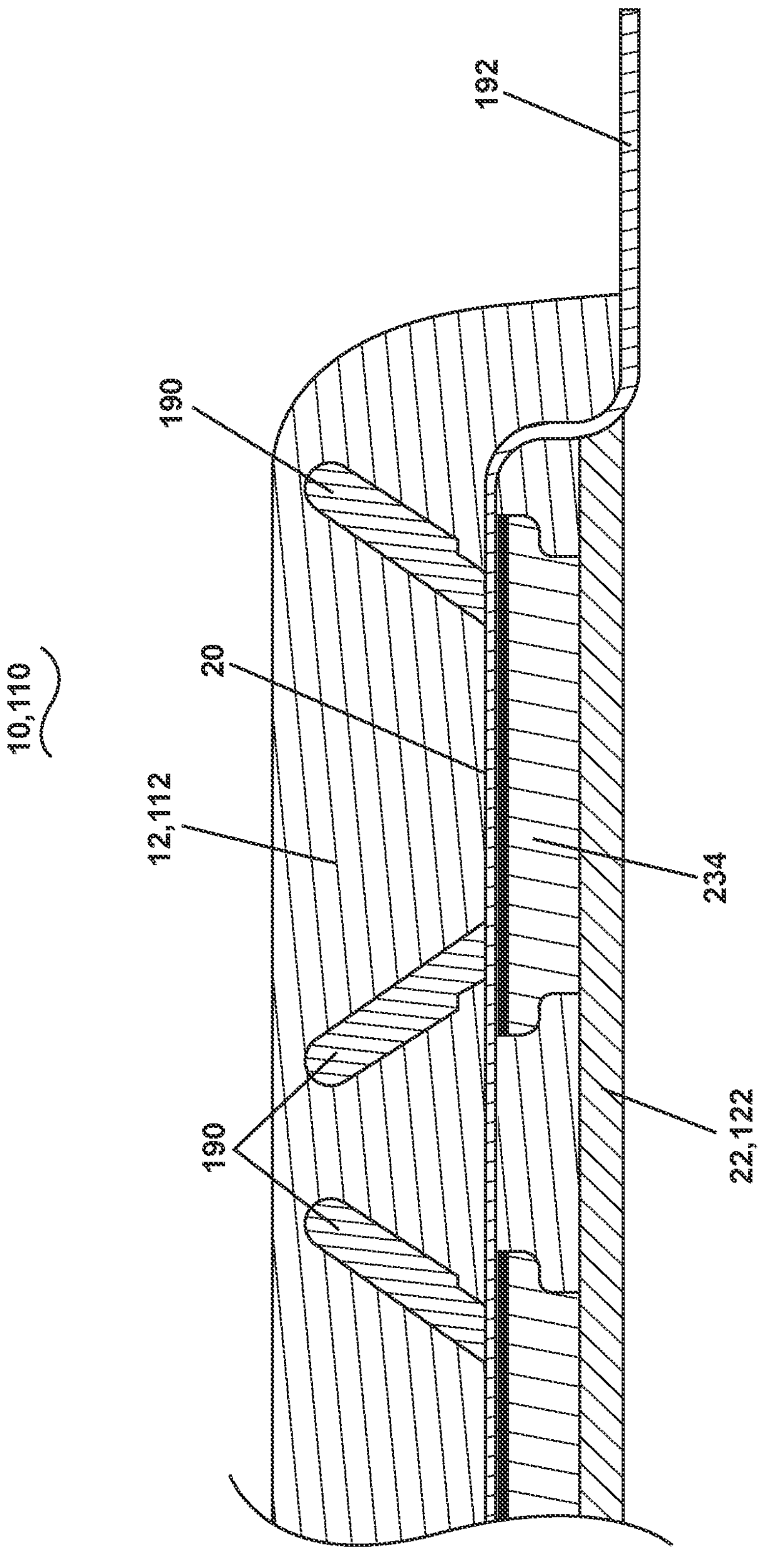
FIG. 10 illustrates a schematic cross-sectional view of the lighting element assembly, taken in a perspective similar to line X-X of FIG. 1, in accordance with various aspects described herein.

FIG. 10 illustrates a partial cross-sectional view of non-limiting aspects of the lighting element assembly 10, 110, taken in the perspective of a similar lighting element assembly 10 view of line X-X of FIG. 1. While the cross-sectional view is taken from aspects of the lighting element assembly 10 of FIG. 1, aspects of FIG. 10 are applicable to the lighting element assemblies 10, 110 described herein, and do not limit aspects of the lighting element assembly 10, or aspects of FIG. 1.

As shown in FIG. 10, the lighting element assembly 10, 110 can further include reflectors 190, which can include, but are not limited to, reflective elements, reflective sidewalls, illumination focusing elements, or the like. Non-limiting aspects of the reflectors 190 can include compositions or materials that define a ridged structure, and can be positioned about an illuminator or group of illuminators, as described herein. As included, the reflectors 190 can focus or aid in directing the illumination in a predetermined lighting pattern. The reflectors 190 can be included as a subcomponent of the optical element 12, 112, the electronics board portion 20, or as an individual component, during assembly. In another non-limiting example, the reflectors 190 can be included when forming the optical element 12, 112, such as during molding or over molding of the optical element 12, 112. The reflectors 190 can comprise rigid or partially rigid structural properties, and be composed of reflective material or material with reflective coating suitable for reflection of illumination from lighting elements. In one non-limiting example, the illumination can include, but is not limited to, 200 to 1100 nanometer wavelength illumination.

Another aspect illustrated in FIG. 10 includes a distinct platform 234, independently formed apart from the base 22, 122. In this example, aspects of the distinct platform 234 can be included wherein the platform 234 includes thermal conductivity characteristics higher than (e.g. more heat conduction) the base 22, 122, or different from the base 22, 122. Yet another aspect illustrated in FIG. 10 is that the electronics board portion 20 can include a connector 192, such as a flexible ribbon, board extension, conductive traces, conductive wires, or pin header (allowing for traditional surface mount connector or through hole solder attachment), which extends laterally beyond the lighting element assembly 10, 110. In this sense, the connector 192 can be utilized or enabled to transmit control signals, operational or electrical power, or a combination thereof, to operational elements of the lighting element assembly 10, 110, or to connect multiple lighting element assemblies 10, 110 in an arrangement (e.g. daisy-chaining or the like).

Figure 11:
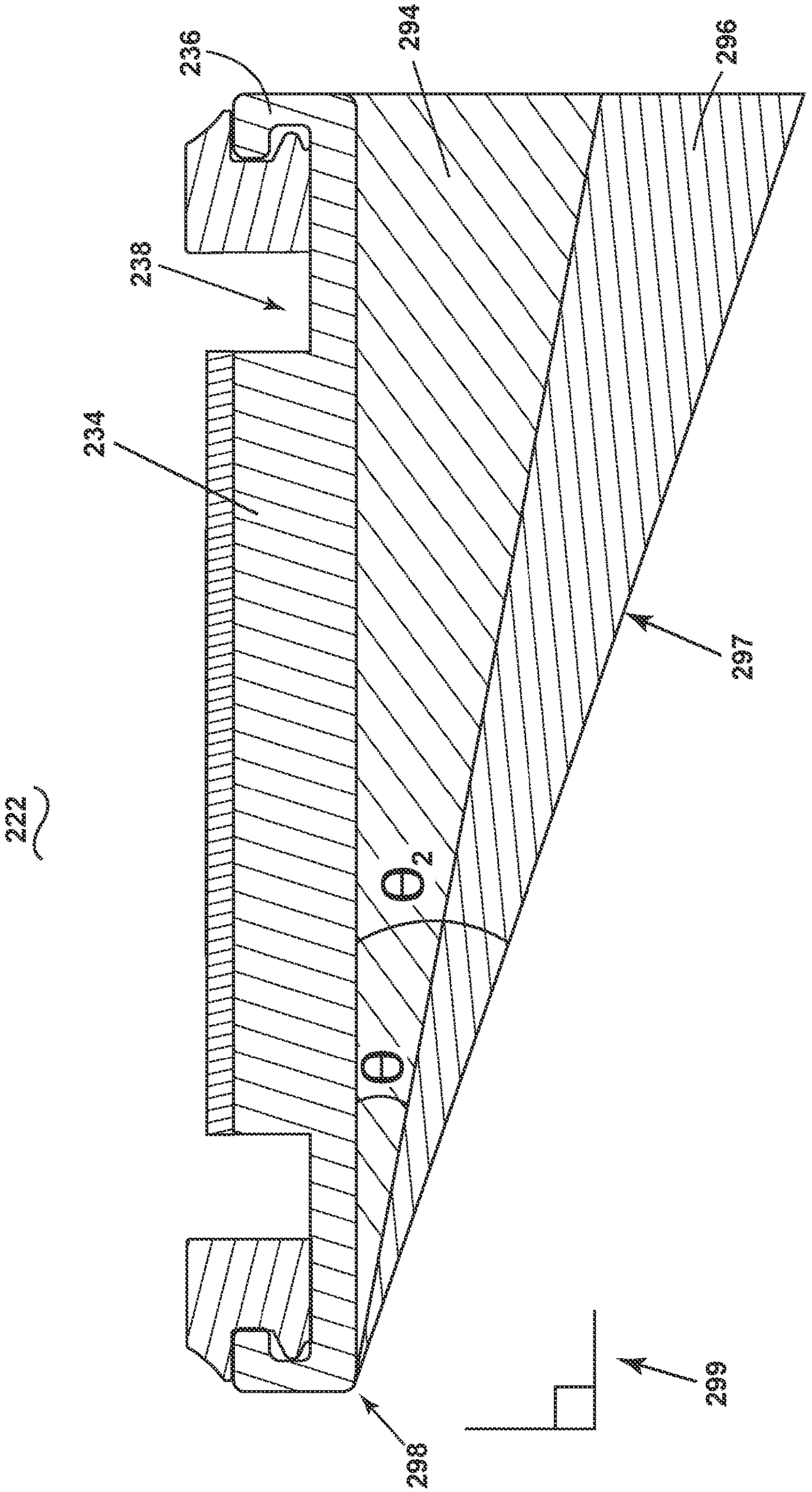
FIG. 11 illustrates a schematic cross-sectional view of a base for the lighting element assembly, in accordance with various aspects described herein.

FIG. 11 illustrates a partial cross-sectional view of non-limiting aspects of the base 222 according to another aspect of the present disclosure. The base 222 is similar to the base 22, 122; therefore, like parts will be identified with like numerals increased to 200, with it being understood that the description of the like parts of the base 22, 122 applies to the base 222, unless otherwise noted. One difference is the base 222 can include an angled surface as a lower surface 297 of the base 222. As shown, inserts or wedges 294, 296 can be included at the base 222, or can be integral with the base 222, to define a surface 297 angled relative to a right angle (with reference shown as 299) or otherwise previously described perpendicularly-extending features (such as the platform 234). In this sense, the base 222 can be mounted relative to a mounting surface aligned with angled surface 297, such that, for instance, any illumination from LEDs (not shown for brevity) can be angled relative to the mounting surface or the angled surface 297. While wedges 294 and 296 are shown having different cross-sections, non-limiting examples can be included where any number of wedges 294, 296 (including only one wedge) can be included, and where different wedge(s) 294, 296 can have different angled surfaces 297 offset relative to a right angle 299. The angling of the angled surface 297 can be relative to one or more points 298 or edge, defining an angle. It is envisioned any angling of the angled surface 297 (relative to a right angle 299) of zero degrees to 90 degrees is adaptable in aspects of the disclosure.

Many other possible embodiments and configurations in addition to that shown in the above figures are contemplated by the present disclosure. For example, one non-limiting aspect of the disclosure can be included wherein an additional sealing element, such as a flexible material, adhesive, glue, sealant, cement, epoxy, the like, or combinations thereof, can be received into or proximate to gaps, spaces, interfaces, or the like, to provide or improve the weatherproof seal or retention described herein. For example, in one non-limiting aspect of the disclosure, sealant can be introduced or received into the depression portion 38, 138 and utilized to operably seal the optical element 12, 112 relative to the base 22, 122, 222, including, but not limited to, an inner portion, an outer portion, an upper portion (e.g. perspective relative to FIGS. 3-5), a lower portion, or a combination thereof. Furthermore, in another non-limiting aspect of the disclosure, sealant can be introduced or received into a portion of the lighting element assembly 10, 110 relative to the leg 50, 150 or foot 160, at an inner portion, an outer portion, a upper portion (e.g. perspective relative to FIGS. 3-5), a lower portion, or a combination thereof.

In yet another non-limiting example, a surface of the lighting element assembly contacting, facing, or otherwise proximate to a mounting surface for the lighting element assembly can be molded, configured, keyed, or otherwise adjusted such that the facing surfaces are in a matching or corresponding relationship. For instance, one of the base 22, 122, 222, the angled surfaces 297, or a sub combination thereof, can include a concave or convex curvature (or another or additional non-planar surface shaping) which corresponds to match a mounting surface.

In yet another non-limiting aspect of the disclosure, the lighting element assembly 10, 110 can be included wherein the leg 50, 150 is received directly into at least a portion of the depression portion 38, 138, and retained relative to the base 22, 122, by way of the sealant, adhesive, glue, or the like, without including a retention element or bezel.

The embodiments disclosed herein provide a vehicle lighting assembly. Aspects described herein can include optical grade clear flexible material in a single component that includes optics, structure, and sealing elements with variable assembly or manufacturing options. Non-limiting exemplar lens material examples for aspects of the optical element 12, 112 can include optical grade silicone, optical liquid injection molded silicone rubber, a transparent and flexible thermoset material, or the like. In another non-limiting aspect, the optical element 12, 112 can comprise a composition with material properties of high transmissivity of wavelengths of light between 200 and 1100 nanometer (UV to near IR) and refractive index similar to glass.

Another advantage of aspects of the disclosure can include shaping or design of the base 22, 122 (e.g. non-ovate shaping) allowing for or enabling assembly of multiple lighting element assemblies 10, 110 in predetermined patterns, for example, as honeycombing patterns, allowing for gap-less arrangement covering of planar or non-planar surfaces. Yet another advantage that can be realized in the above embodiments is that the above-described aspects have superior size and durability advantages over conventional lighting fixtures. The flexible silicon or silicone optical elements provide for improved durability, or are more resistant to chips, cracks, or dulling, compared with similarly configured and sized polycarbonate type lens. The aforementioned configurations further provide for a thermally coupled heat sink that can be further connected with a vehicle mounting surface, further enabling increased heat removal or cooling capabilities compared with conventional configurations. Yet another advantage of the above-described aspects is that the lighting element assembly includes no sharp edges, allowing the lighting element assembly to meet state, local, or federal guidelines relating to smooth outer surface requirements.

Yet another advantage of the described assembly is that the optical elements allow for selective doping, tinting, or coloring of the housing to provide reduced visibility, or increased concealment of the assembly, compared with conventional lighting elements. Reduced visibility, or increased concealment can result in more effective vehicle utilization, such as for law enforcement. Reduced visibility or increased concealment is further enabled by a lower overall height of the lighting element assembly, as described. Yet another advantage of the described assembly is that the mounting of the lighting element assembly can provide for at least one integrated weather-tight seal, preventing moisture or debris from entering the assembly, or interfering with the electronics such as the circuit board or LEDs. Existing lighting assemblies typical include additional components to ensure a seal, such as a separate O-ring type of seal. The interference of weather can increase maintenance efforts, or prematurely reduce the expected operating life of the assembly or subcomponents.

Yet another advantage of the described assembly is that the assembly allows for or enables a set of multi-colored LEDs to be included, as well as conformity of controlling operations for the multi-colored LEDs. By enabling multi-colored, controllable LEDs, a single lighting element assembly can effectively function as a set of different, single-colored lighting assemblies or lighting assemblies with multicolor mixing (e.g. LEDs of different light, color, or wavelength output). Yet another advantage of the described assembly is that the assembly allows for or enables the molding of the housing or optical elements into shapes not otherwise possible with traditional engineering thermoplastics. Another advantage is the integrated single piece 12 with short optical profile height of the full assembly relative to the mounting surface 62.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting element assembly, comprising:

an optical element having a leg extending away from the optical element, the leg including a compressible material;

a base defining a depression portion receiving the leg; and a retention element received by at least a portion of the depression portion and configured to retain the leg relative to the base;

wherein the leg is configured to compress in response to receiving the retention element in the depression portion, wherein the retention element is a ring, and wherein a central opening of the ring is configured to receive an outer perimeter of the optical element.

2. The lighting element assembly of claim 1, wherein the retention element is a bezel.

3. The lighting element assembly of claim 1, wherein the optical element is an ovate lens.

4. The lighting element assembly of claim 1, wherein the base defines an outer ring extending away from the base.

5. The lighting element assembly of claim 4, wherein the retention element is received between the outer ring and the leg.

6. The lighting element assembly of claim 4, wherein the base further defines a platform, wherein the platform and the outer ring each extend away from the depression portion, and wherein the leg and the retention element are received between the outer ring and platform.

7. The lighting element assembly of claim 4, wherein the leg further defines a foot extending radially away from the leg.

8. The lighting element assembly of claim 4, wherein the outer ring further includes a lip extending over at least a portion of the depression portion.

9. The lighting element assembly of claim 8, wherein the retention element includes a protrusion at an outer surface, and wherein the retention element is retained in the at least a portion of the depression portion by the lip extending over the protrusion.

10. The lighting element assembly of claim 9, wherein at least one of the retention element, the protrusion, the lip, or the outer ring is adapted to temporarily deform as the retention element is received in the at least a portion of the depression portion.

11. The lighting element assembly of claim 1, wherein the leg extends along the entire perimeter of the optical element.

12. The lighting element assembly of claim 1, wherein a sealing element is received within the depression portion between the base and at least one of the leg or the retention element.

13. The lighting element assembly of claim 1, wherein the base is non-planar.

14. The lighting element assembly of claim 13, wherein the base defines at least one of concave or a convex surface.

* * * * *